(12) United States Patent
Seagraves

(10) Patent No.: US 9,188,223 B1
(45) Date of Patent: Nov. 17, 2015

(54) HAPTIC FEEDBACK SHIFT INDICATOR

(71) Applicant: FORD GLOBAL TECHNOLOGIES, LLC, Dearborn, MI (US)

(72) Inventor: Jamel Seagraves, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/473,407

(22) Filed: Aug. 29, 2014

(51) Int. Cl.
*F16H 59/02* (2006.01)
*F16H 61/24* (2006.01)
*B60W 10/10* (2012.01)

(52) U.S. Cl.
CPC .......... *F16H 61/24* (2013.01); *F16H 2061/241* (2013.01)

(58) Field of Classification Search
CPC .. F16H 59/02; F16H 59/0278; F16H 2306/00
USPC ................... 701/41, 52, 54; 340/905; 477/77; 74/473.3
See application file for complete search history.

(56) References Cited

U.S. PATENT DOCUMENTS

| 8,710,965 | B2 | 4/2014 | Li | |
| 2007/0276570 | A1* | 11/2007 | AbuSamra | 701/54 |
| 2010/0198458 | A1 | 8/2010 | Buttolo et al. | |
| 2011/0153163 | A1 | 6/2011 | Jeong | |
| 2012/0242465 | A1 | 9/2012 | Murata et al. | |
| 2013/0080001 | A1* | 3/2013 | Cousins et al. | 701/54 |
| 2014/0121913 | A1* | 5/2014 | Sata | 701/52 |

OTHER PUBLICATIONS

Ege, Enes Selman et al., "Vibrotactile Feedback in Steering Wheel Reduces Navigation Errors during GPS-Guided Car Driving", IEEE World Haptics Conference 2011, Jun. 21-24, 2011, pp. 345-348, Istanbul, Turkey.
Hwang, Sungjae et al., "The Haptic Steering Wheel: Vibro-tactile based Navigation for the Driving Environment", IEEE, 2010. pp. 660-665.
Oh, Sunyoung et al., "Preliminary Evaluation of Multi-Vibration Haptic Feedback on a Steering Wheel Spinner", IEEE.org, IEEE Xplore Digital Library, Control, Automation and Systems (ICCAS), 2013 13th International Conference. Oct. 20-23, 2013, 2 pages.
Kim, Hyunho et al., "Vibrotactile Display for Driving Safety Information", IEEE.org, IEEE Xplore Digital Library, Intelligent Transportation Systems Conference, 2006, ITSC '06 IEEE, Sep. 17-20, 2006, 1 page.
Sucu et al., "Haptic Interface for Non-Visual Steering", ACM Digital Library, IUI '13, Proceedings of the 2013 International Conference on Intelligent User Interfaces, 2013, 1 page.

* cited by examiner

*Primary Examiner* — Tan Q Nguyen
(74) *Attorney, Agent, or Firm* — Frank A. MacKenzie; Brooks Kushman P.C.

(57) ABSTRACT

A shift indication system for a vehicle is provided. The shift indication system includes a haptic feedback device and a controller programmed to activate the haptic feedback device in response to an engine speed traversing a predetermined threshold. The haptic feedback device is activated with a first pattern if the speed is increasing to prompt a vehicle operator to perform an upshift and a second pattern if the speed is decreasing to prompt a vehicle operator to perform a downshift.

13 Claims, 2 Drawing Sheets

HAPTIC FEEDBACK SHIFT INDICATOR

TECHNICAL FIELD

The present disclosure relates to haptic feedback devices utilized in vehicle systems.

BACKGROUND

Visual notification features may be used in vehicles to notify drivers of current vehicle conditions or changes in the vehicle conditions. A visual notification may indicate some action that is required on the part of the driver. Visual notification features, however, may require drivers to take their eyes off the road. In addition, visual notification features may be missed when a driver is unable to divert their eyes from the road.

SUMMARY

A shift indication system for a vehicle is provided. The shift indication system includes a haptic feedback device and a controller programmed to, in response to an engine speed traversing a predetermined threshold, activate the haptic feedback device. The haptic feedback device is activated with a first pattern if the speed is increasing to prompt a vehicle operator to perform an upshift and a second pattern if the speed is decreasing to prompt a vehicle operator to perform a downshift.

A vehicle is provided. The vehicle includes an engine, a transmission, a steering wheel, a haptic feedback device integrated into the steering wheel, and a controller. The controller is programmed to activate the haptic feedback device, in response to and engine speed traversing a predetermined threshold, in order to alert a vehicle operator when a gearshift in the transmission is required.

The haptic feedback device in the vehicle may be activated with a predefined pattern in order to alert the vehicle operator when a gearshift is required. The predefined pattern may be defined by activating a portion of the array on one side of the steering wheel in clockwise pattern, and activating a portion of the array on a side opposite the one side of the steering wheel in a counter-clockwise pattern.

A method of signaling a vehicle operator regarding a required gearshift in a transmission is provided. According to the method, a sequential motor array is either activated in an upward pattern or a downward pattern. The sequential motor array is activated in the upward pattern when an engine speed exceeds a first predetermined threshold, which indicates that an upshift is required. The sequential motor array is activated in the downward pattern when the engine speed falls below a second predetermined threshold, which indicates that a downshift is required.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Early, or late, shifts in manual transmissions (or automatic transmission with manual modes) can negatively impact performance and fuel economy, as well as accelerate wear and tear on a vehicle's powertrain. Indicators for shift points may alleviate the problems associated with early or late shifting. Visual indicators for shift points may encourage vehicle operators to take their eyes off the road. The use of haptic feedback for shift indicators both alleviates the problems associated with early or late shifting, and eliminates the need of the operator to take their eyes off the road.

Figure 1:
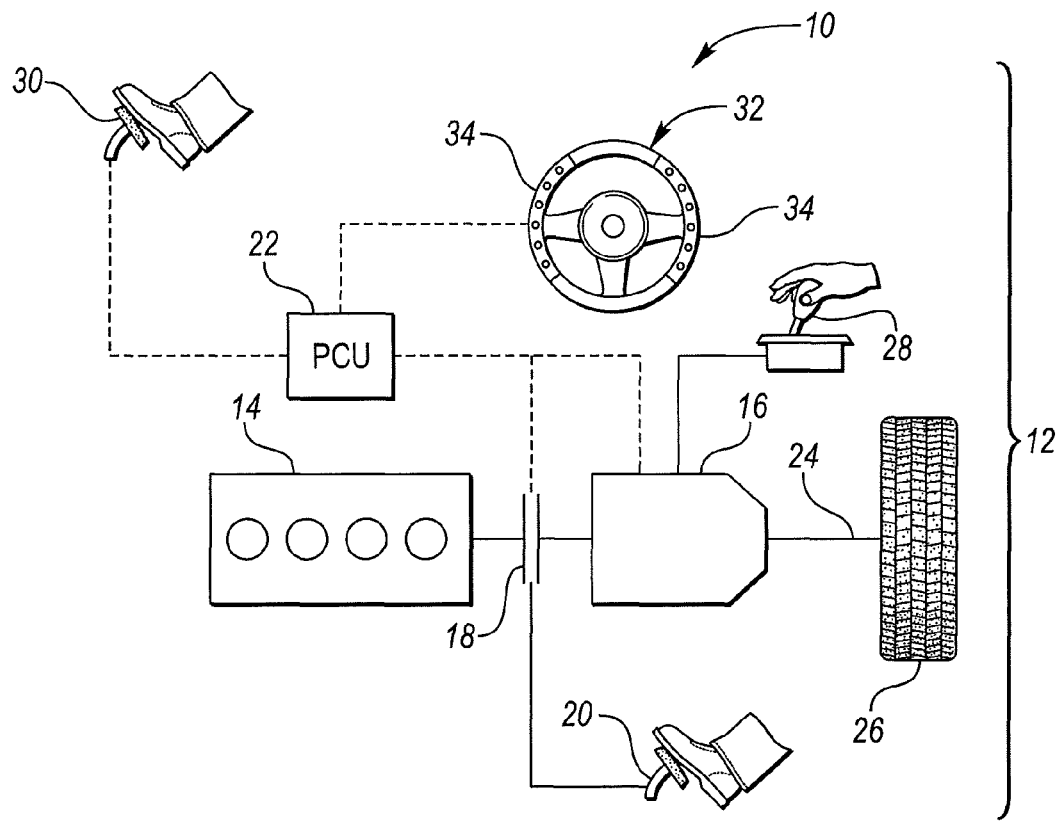
FIG. 1 is a schematic diagram illustrating a shift indication system for a vehicle.

Referring to FIG. 1, a shift indication system 10 for a vehicle 12 is illustrated. An engine 14 is connected to a transmission 16 by a launch clutch 18. The launch clutch 18 may be engaged or disengaged by the vehicle operator with a launch clutch pedal 20. The engine 14 and transmission may both be in communication with and controlled by a powertrain control unit (PCU) 22. The transmission 16 may be either a manual transmission or an automatic transmission that has a manual mode. In applications where the transmission 16 is an automatic transmission that has a manual mode, the launch clutch 18 may be in communication with and controlled by the PCU 22, which would eliminate the need for a launch clutch pedal 20. In other instances where the transmission 16 is an automatic transmission that has a manual mode, the launch clutch may be replaced by a torque converter which would also eliminate the need for a launch clutch pedal 20. A transmission output 24 is connected to at least one traction wheel 26 in order to propel the vehicle 12. A manual gear shifting device 28 is utilized by the vehicle operator to shift between the various gears of the transmission 16. An accelerator pedal 30 provides torque requests which are input into the PCU 22 and relayed to the engine 14. A steering wheel 32 is provided to guide the vehicle. A haptic feedback device 34 that is in communication with the PCU 22 is also provided.

While illustrated as one controller, the PCU 22 may be part of a larger control system and may be controlled by various other controllers throughout the vehicle 12, such as a vehicle system controller (VSC). It should therefore be understood that the PCU 22 and one or more other controllers can collectively be referred to as a "controller" that controls various actuators in response to signals from various sensors to control functions such as selecting or scheduling transmission shifts, etc. The PCU 22 may include one or more microprocessors or central processing units (CPUs) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 2:
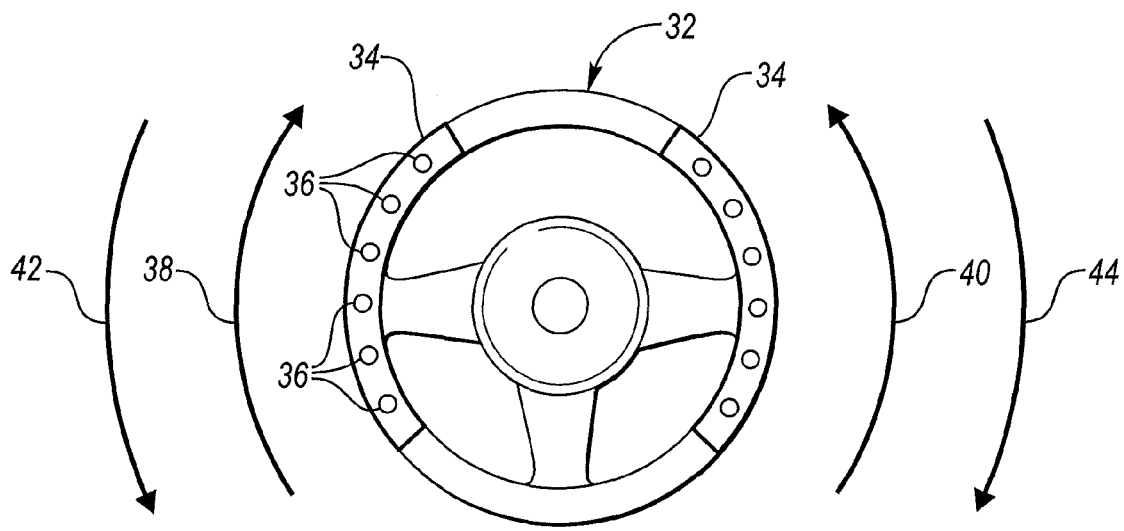
FIG. 2 is a front view of a steering wheel having a haptic feedback device.

Referring to FIG. 2, the haptic feedback device 34 is shown as part of a steering wheel 32. The haptic feedback device shown has two portions, but should not be construed as limited to this configuration. Other configurations, such as one or more portions should be considered as disclosed herein. The haptic feedback device 34 may an integral part of the steering wheel 32 or may consist of a device, such as a cuff, that is detachably connected to the steering wheel 32. The haptic feedback device may include a sequential motor array 36. The sequential motor array 36 is a series of vibration motors that activate in a sequential pattern. The sequential pattern may include an overlapping sequence where the motors are activated with an interval delay that may range between 30 ms and 300 ms. The sequential motor array 36 is shown on the front of the steering wheel 32, but should not be construed as limited to this configuration. Other configurations, such as placing the sequential motor array 36 on the sides or backside of steering wheel 32 should be considered as disclosed herein.

The PCU 22 is programmed to activate the haptic feedback device 34 to alert the vehicle operator that a gearshift in the transmission 16 is required when the engine speed traverses a predetermined threshold. The engine speed may be measured by any conventional sensor known in the art. Once measured, the engine speed is input into the PCU 22 which then signals the haptic feedback device 34 to activate once the engine speed has traversed the predetermined threshold. The haptic feedback device 34 is configured to activate in a first pattern to indicate that an upshift is required when the engine speed increases to exceed a predetermined threshold. The haptic feedback device 34 is configured to activate in a second pattern to indicate that a downshift is required when the engine speed decreases and falls below a predetermined threshold.

With continued reference to FIG. 2, the first pattern indicating that an upshift is required may include activating the motors of the sequential motor array 36 located on the left side of the steering wheel in a clockwise pattern, as indicated by arrow 38, and activating the motors of the sequential motor array 36 located on the right side of the steering wheel in a counter-clockwise pattern, as indicated by arrow 40. The first pattern may also be designated as an upward pattern. The second pattern indicating that a downshift is required may include activating the motors of the sequential motor array 36 located on the left side of the steering wheel in a counter-clockwise pattern, as indicated by arrow 42, and activating the motors of the sequential motor array 36 located on the right side of the steering wheel in a clockwise pattern, as indicated by arrow 44. The second pattern may also be designated as a downward pattern.

The predetermined threshold may be adjusted depending on the torque request that is being generated by the vehicle operator with the accelerator pedal 30. The adjustment in the predetermined threshold may be made according to a conventional shift schedule. A shift schedule determines when an upshift or downshift is required. Several factors are utilized to determine when an upshift or downshift is required according to the shift schedule. The factors include engine speed, the gear the transmission is currently in, and the vehicle operator's torque request. Shift schedules are known in the art and are likely unique to vehicle models. The predetermined threshold for an upshift may be increased with an increase in the torque request. The predetermined threshold of the engine speed for an upshift may range from 2000 RPM to 6000 RPM. The predetermined threshold for a downshift may be decreased with a decrease in the torque request. The predetermined threshold of the engine speed for a downshift may range from 600 RPM to 1500 RPM.

Figure 3:
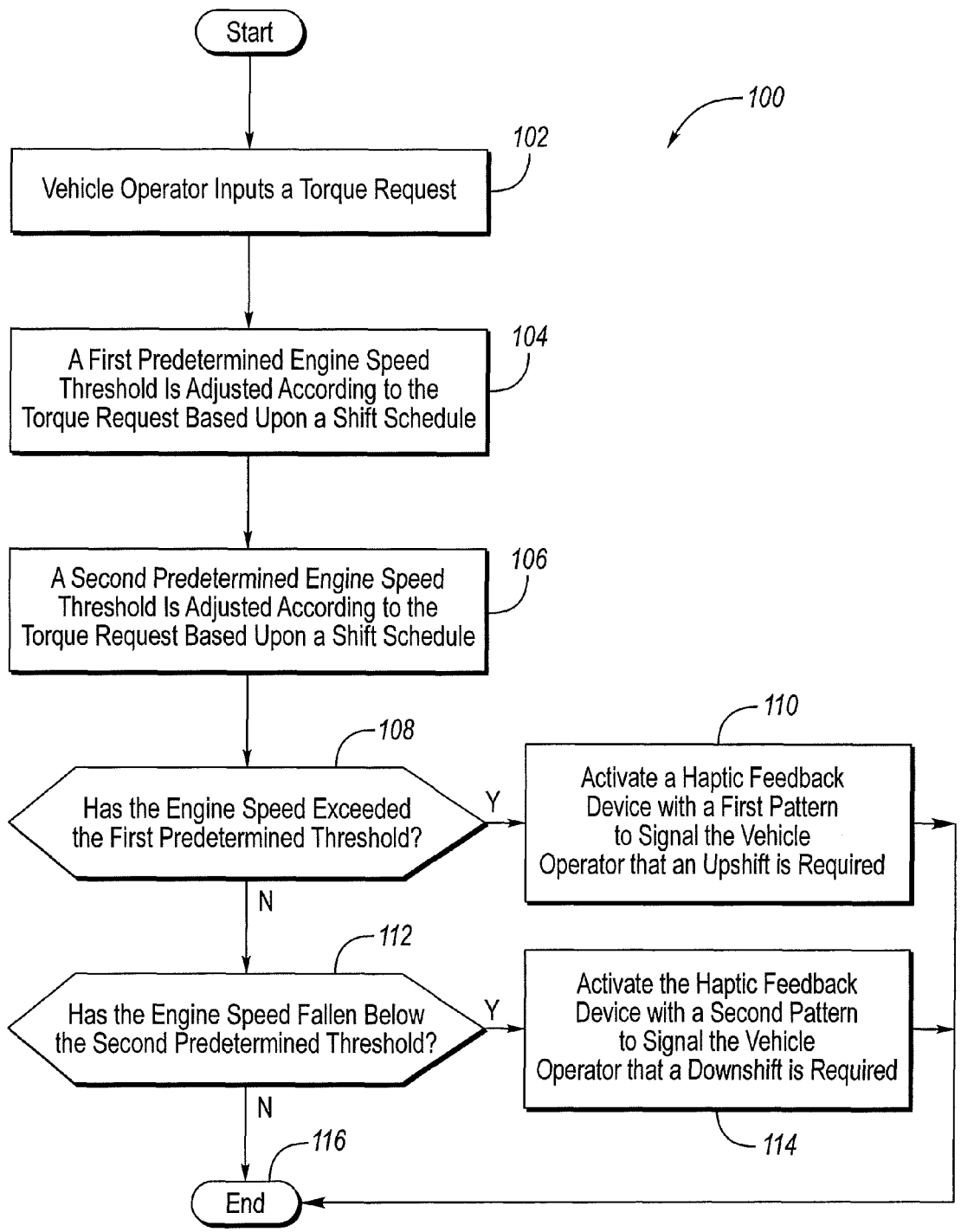
FIG. 3 is a flowchart illustrating a method of signaling a vehicle operator that gearshift required.

Referring to FIG. 3, a flowchart illustrates a method 100 of signaling a vehicle operator that a gearshift is required. The method 100 may be implemented using software code contained within the PCU 22. In other embodiments, the method may be implemented in other vehicle controllers, or distributed among multiple vehicle controllers. The embodiment described herein will assume the software code is contained within the PCU 22 for simplicity purposes.

At step 102, the vehicle operator inputs a torque request with the accelerator pedal 30. Once the vehicle operator has input the torque request, a first predetermined engine speed threshold is adjusted according to the torque request based upon a shift schedule at step 104. A second predetermined engine speed threshold is then adjusted also according to the torque request based upon a shift schedule at step 106.

At step 108 it is determined whether the engine speed has exceeded the first predetermined threshold. If the engine speed has exceeded the first predetermined threshold, the haptic feedback device 34 is activated at step 110 with a first pattern indicating to the vehicle operator that an upshift is required. If the engine speed has not exceeded the first predetermined threshold, it is then determined whether the engine speed has fallen below the second predetermined threshold at step 112. If the engine speed has fallen below the second predetermined threshold, the haptic feedback device 34 is activated at step 114 with a second pattern indicating to the vehicle operator that a downshift is required. If the engine speed has not fallen below the second predetermined threshold, the method comes to an end at step 116.

Although the haptic feedback device is shown as connected to or part of a steering wheel, the disclosure should not be limited to this embodiment alone. Other embodiments in which a device is providing haptic feedback to a vehicle operator indicating that an upshift or downshift is required in the vehicle transmission should be construed as contained herein. For example, the haptic feedback device may be located in the seatback, seat bottom, or other vehicle components that come into contact with the vehicle operator.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A shift indication system for a vehicle comprising:
a haptic feedback device including an array of actuators, the haptic feedback device configured to detachably couple to a steering wheel; and
a controller programmed to, in response to an engine speed traversing a predetermined threshold, activate the actuators with a first pattern if the speed is increasing to prompt a vehicle operator to perform an upshift and a second pattern if the speed is decreasing to prompt a vehicle operator to perform a downshift.

2. The system of claim 1, wherein the haptic feedback device is mounted on a steering wheel and wherein the first pattern is defined by
   activating a portion of the array on one side of the steering wheel in a clockwise pattern, and
   activating a portion of the array on a side opposite the one side of the steering wheel in a counter-clockwise pattern.

3. The system of claim 1, wherein the haptic feedback device is mounted on a steering wheel and wherein the second pattern is defined by
   activating a portion of the array on one side of the steering wheel in counter-clockwise pattern, and
   activating a portion of the array on a side opposite the one side of the steering wheel in a clockwise pattern.

4. The system of claim 1, wherein the haptic feedback device comprises at least one cuff having the actuators mounted thereon.

5. The system of claim 1, wherein the predetermined threshold increases as an engine torque request increases.

6. The system of claim 1, wherein the predetermined threshold decreases as an engine torque request decreases.

7. A vehicle comprising:
   an engine;
   a transmission;
   a steering wheel;
   a haptic feedback array integrated with the steering wheel; and
   a controller programmed to, in response to a speed of the engine traversing a predetermined threshold, activate the haptic feedback array with a predefined pattern to alert a vehicle operator that a gearshift in the transmission is required, the predefined pattern indicating that a transmission upshift is required if the speed exceeds the predetermined threshold.

8. The vehicle of claim 7, wherein the predefined pattern is defined by
   activating a portion of the array on one side of the steering wheel in a clockwise pattern, and
   activating a portion of the array on a side opposite the one side of the steering wheel in a counter-clockwise pattern.

9. The vehicle of claim 7, wherein the predefined pattern is defined by
   activating a portion of the array on one side of the steering wheel in a counter-clockwise pattern, and
   activating a portion of the array on a side opposite the one side of the steering wheel in a clockwise pattern.

10. The vehicle of claim 7, wherein the predetermined threshold increases as torque requests for the engine increase.

11. The vehicle of claim 7, wherein the predefined pattern indicates that a downshift of the transmission is required if the speed falls below a second predetermined threshold.

12. The vehicle of claim 11, wherein the second predetermined threshold decreases as torque requests for the engine decrease.

13. A method of signaling a vehicle operator that a gearshift in a transmission is required comprising:
   activating a haptic sequential motor array in a first directional pattern, in response to an engine speed exceeding a first predetermined threshold, to indicate that an upshift is required; and
   activating the haptic sequential motor array in a second directional pattern opposite the first, in response to the engine speed falling below a second predetermined threshold, to indicate that a downshift is required, wherein at least one of the first predetermined threshold and second predetermined threshold are adjusted based on an engine torque request.

* * * * *